United States Patent
Lindheimer et al.

(10) Patent No.: US 9,622,204 B2
(45) Date of Patent: Apr. 11, 2017

(54) IDENTIFICATION OF A WIRELESS DEVICE IN A WIRELESS COMMUNICATION ENVIRONMENT

(71) Applicant: Telefonaktiebolaget L M Ericsson (publ), Stockholm (SE)

(72) Inventors: Christofer Lindheimer, Linköping (SE); Filip Mestanov, Sollentuna (SE); Oumer Teyeb, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 138 days.

(21) Appl. No.: 14/405,365

(22) PCT Filed: Oct. 29, 2014

(86) PCT No.: PCT/SE2014/051272
§ 371 (c)(1),
(2) Date: Dec. 3, 2014

(87) PCT Pub. No.: WO2016/068762
PCT Pub. Date: May 6, 2016

(65) Prior Publication Data
US 2016/0219548 A1   Jul. 28, 2016

(51) Int. Cl.
*H04W 4/00* (2009.01)
*H04W 60/00* (2009.01)
(Continued)

(52) U.S. Cl.
CPC .......... *H04W 60/00* (2013.01); *H04W 12/06* (2013.01); *H04W 48/08* (2013.01); *H04W 76/02* (2013.01);
(Continued)

(58) Field of Classification Search
CPC ... H04W 60/00; H04W 48/08; H04W 76/021; H04W 84/12
(Continued)

(56) References Cited

U.S. PATENT DOCUMENTS 8,743,828 B2    6/2014  Wang et al.
2011/0222523 A1* 9/2011  Fu .......................... H04W 36/22
                                                       370/338
(Continued)

FOREIGN PATENT DOCUMENTS

WO    WO 2014/000808 A1    1/2014

OTHER PUBLICATIONS

3GPP, Technical Specification, "3rd Generation Partnership Project; Technical Specification Group Services and System Aspects; Architecture enhancements for non-3GPP accesses (Release 12)", 3GPP TS 23.402 V12.4.0 (Mar. 2014), 288 pp.
(Continued)

*Primary Examiner* — Marcos Batista
(74) *Attorney, Agent, or Firm* — Myers Bigel, P.A.

(57) ABSTRACT

There is provided a method of enabling identification of a wireless device in a wireless communication environment, the wireless device being attached to a cellular radio communication network. The method comprises the step of the wireless device sending, to a network node in a Wireless Local Area Network, WLAN, an identifier of the wireless device valid in the cellular radio communication network before or when contacting the WLAN for association of the wireless device in the WLAN. The identifier of the wireless device valid in the cellular radio communication network is signaled in a WLAN message to the network node in the WLAN.

22 Claims, 16 Drawing Sheets

(51) Int. Cl.
  *H04W 12/06* (2009.01)
  *H04W 76/02* (2009.01)
  *H04W 48/08* (2009.01)
  *H04W 84/12* (2009.01)
  *H04W 88/06* (2009.01)

(52) U.S. Cl.
  CPC .......... *H04W 76/021* (2013.01); *H04W 84/12* (2013.01); *H04W 88/06* (2013.01)

(58) Field of Classification Search
  USPC ........................................ 455/435.1; 370/338
  See application file for complete search history.

(56) References Cited

U.S. PATENT DOCUMENTS

| | | | |
|---|---|---|---|
| 2014/0079007 A1 | 3/2014 | Li et al. | |
| 2014/0204927 A1* | 7/2014 | Horn et al. | H04W 8/26 370/338 |
| 2014/0221004 A1 | 8/2014 | Goldfarb | |
| 2016/0007177 A1* | 1/2016 | De Leo | H04W 4/22 455/404.2 |

OTHER PUBLICATIONS

Aboba et at., "RADIUS (Remote Authentication Dial in User Service) Support for Extensible Authentication Protocol (EAP)", Network Working Group, Request for Comments: 3579, Sep. 2003, retrieved Dec. 2, 2014 from http://www.ietf.org/rfc/rfc3579.txt, 32 pp.
Haverinen et al., Extensible Authentication Protocol Method for Global System for Mobile Communications (GSM) Subscriber Identity Modules (EAP-SIM), Network Working Group, Request for Comments: 4186, Jan. 2006, retrieved Dec. 2, 2014 from http://www.ietf.org/rfc/rfc4186.txt, 64 pp.
International Search Report, PCT Application No. PCT/SE2014/051272, mailed Jun. 24, 2015.
Written Opinion of the International Searching Authority, PCT Application No. PCT/SE2014/051272, mailed Jun. 24, 2015.
Written Opinion of the International Preliminary Examining Authority, Application No. PCT/SE2014/051272, Oct. 7, 2016.
Ruckus, "How Interworking Works: A Detailed Look at 802.11u and Hotspot 2.0 Mechanisms", Jul. 1, 2013, XP055151427, Retrieved from the Internet: http://a030f85c1e25003d7609-b98377aee968aad08453374eb1df3398.r40.cf2.rackcdn.com/wp/wp-how-interworking-works.pdf [retrieved on Nov. 6, 2014].

* cited by examiner

IDENTIFICATION OF A WIRELESS DEVICE IN A WIRELESS COMMUNICATION ENVIRONMENT

CROSS REFERENCE TO RELATED APPLICATION

This application is a 35 U.S.C. §371 national stage application of PCT International Application No. PCT/SE2014/051272, filed on 29 Oct. 2014, the disclosure and content of which is incorporated by reference herein in its entirety.

TECHNICAL FIELD

The proposed technology generally relates to wireless communication, and more specifically to a method of enabling identification of a wireless device in a wireless communication environment, a method of identifying a wireless device in a wireless communication environment, and a method for assisting in the exchange of information related to a wireless device between at least two different types of wireless networks, as well as corresponding wireless devices, network nodes, computer programs, and computer program products.

BACKGROUND

There is a general demand for efficient identification of a wireless device in a wireless communication environment. More specifically, there is a need for enabling identification of a wireless device, being attached to a cellular radio communication network, in a Wireless Local Area Network, WLAN.

There may also be a need for exchanging information between different types of wireless networks based on the identification of a wireless device, and/or for linking context information of a wireless device between different types of wireless networks, and/or for supporting access selection, mobility, traffic steering and/or access point association for a wireless device in a wireless communication environment. By way of example, this is relevant in a wireless communication environment including a cellular radio communication network and a Wireless Local Area Network, WLAN, to enable efficient interworking between a cellular network and a WLAN such as a Wi-Fi network.

By way of example, mobile operators are today mainly using Wi-Fi to offload traffic from the mobile networks but the opportunity to improve end user experience regarding performance is also becoming more important. The current Wi-Fi deployments are mainly totally separate from mobile networks, and are to be seen as non-integrated. The usage of Wi-Fi is mainly driven due to the free and wide unlicensed spectrum, and the increased availability of Wi-Fi in mobile terminals like smartphones and tablets. The end users are also becoming more and more at ease with using Wi-Fi for example at offices and homes.

The different business segments for Wi-Fi regarding integration possibilities can be divided into mobile operator hosted/controlled vs. 3rd party hosted/controlled Wi-Fi APs (here 3rd party is seen as anything else than mobile operator and that the 3rd party is not totally "trusted" by the mobile operator. 3rd party could be for example a Wi-Fi operator or an end-user him/herself). In both segments there exist public/hotspot, enterprise and residential deployments.

Wi-Fi integration towards the mobile core network is emerging as a good way to improve the end user experience further. These solutions consist mainly of the components: common authentication between 3GPP and Wi-Fi, and integration of Wi-Fi user plane traffic to the mobile core network. The common authentication is based on automatic SIM-based authentication in both access types. The Wi-Fi user plane integration provides the mobile operator the opportunity to provide the same services, like parental control and subscription based payment methods, for the end users when connected both via 3GPP and via Wi-Fi. Different solutions are standardized in 3GPP: Overlay solutions (S2b, S2c) are specified since 3GPP Rel-8 while integration solutions (S2a) are currently work-in-progress (S2a, S2b, S2c indicating the 3GPP interface/reference point name towards the PDN-GW). These solutions are specified in 3GPP TS 23.402.

For example, a mobility decision normally requires that both the context of a wireless device such as a UE or mobile station in the cellular network and the WLAN are available in order to take an optimum access selection decision. Currently, the only common UE identifier in both the cellular network domain and the WLAN domain is the International Mobile Subscriber Identity, IMSI. The problem is that the IMSI is not available before EAP authentication is initiated, and hence the mobility decision entity needs to have the wireless device perform an Open System Authentication in WLAN in order to obtain the IMSI and link the context of the wireless device in WLAN to the context in the cellular domain. This approach takes time and normally leads to inefficient usage of resources. For example, a wireless device such as a UE could be denied access to WLAN by the mobility decision function; and even though access has been denied and the UE is not using the WLAN network, it still had to connect and send several Over-The-Air, OTA, messages.

Furthermore, for security purposes most wireless devices such as UEs nowadays will not expose their permanent identity, i.e. IMSI, and this generally prevents the WLAN network from obtaining the permanent identity right away.

SUMMARY

It is an object to provide a method of enabling identification of a wireless device in a wireless communication environment.

It is also an object to provide a method of identifying a wireless device in a wireless communication environment.

Another object is to provide a method for assisting in the exchange of information related to a wireless device between at least two different types of wireless networks.

Yet another object is to provide a wireless device configured for operation in a wireless communication environment.

Still another object is to provide a network node configured for operation in a Wireless Local Area Network, WLAN, and configured to identify a wireless device being attached to a cellular radio communication network.

It is an object to provide a network node configured to assist in the exchange of information related to a wireless device between at least two different types of wireless networks.

It is also an object to provide corresponding computer programs and computer program products.

Another object is to provide a wireless device for operation in a wireless communication environment.

Yet another object is to provide a network node for operation in a Wireless Local Area Network, WLAN, and for identifying a wireless device being attached to a cellular radio communication network.

Still another object is to provide a network node for assisting in the exchange of information related to the wireless device.

These and other objects are met by at least one embodiment of the proposed technology.

According to a first aspect, there is provided a method of enabling identification of a wireless device in a wireless communication environment, the wireless device being attached to a cellular radio communication network. The method comprises the wireless device sending, to a network node in a Wireless Local Area Network, WLAN, an identifier of the wireless device valid in the cellular radio communication network before or when contacting the WLAN for association of the wireless device in the WLAN. The identifier of the wireless device valid in the cellular radio communication network is signaled in a WLAN message to the network node in the WLAN.

According to a second aspect, there is provided a method of identifying a wireless device in a wireless communication environment, the wireless device being attached to a cellular radio communication network. The method comprises a network node in a Wireless Local Area Network, WLAN, receiving an identifier of the wireless device valid in the cellular radio communication network, wherein the identifier is received before association of the wireless device in the WLAN or when the network node is being contacted by the wireless device for association in the WLAN. The identifier of the wireless device valid in the cellular radio communication network is received in a WLAN message from the wireless device. The method also comprises the network node extracting the identifier from the WLAN message. The method further comprises the network node obtaining information representing the identity of the wireless device in the cellular radio communication network based on the identifier.

According to a third aspect, there is provided a method for assisting in the exchange of information related to a wireless device between at least two different types of wireless networks including a Wireless Local Area Network, WLAN, and a cellular radio communication network. The method comprises a network node in the WLAN receiving an identifier of the wireless device valid in the cellular radio communication network, wherein the identifier is received before association of the wireless device in the WLAN or when the network node is being contacted by the wireless device for association in the WLAN. The identifier of the wireless device valid in the cellular radio communication network is received in a WLAN message from the wireless device. The method also comprises the network node extracting the identifier from the WLAN message. The method further comprises the network node assisting in the exchange of information between the WLAN and the cellular radio communication network based on the identifier.

According to a fourth aspect, there is provided a wireless device configured for operation in a wireless communication environment. The wireless device is configured to send, to a network node in a Wireless Local Area Network, WLAN, an identifier of the wireless device valid in a cellular radio communication network before or when contacting the WLAN for association of the wireless device in the WLAN. The wireless device is configured to send the identifier of the wireless device valid in the cellular radio communication network in a WLAN message to the network node in the WLAN.

According to a fifth aspect, there is provided a network node configured for operation in a Wireless Local Area Network, WLAN, and configured to identify a wireless device being attached to a cellular radio communication network. The network node is configured to receive an identifier of the wireless device valid in the cellular radio communication network, before association of the wireless device in the WLAN or when the network node is being contacted by the wireless device for association in the WLAN. The network node is configured to receive the identifier of the wireless device valid in the cellular radio communication network in a WLAN message from the wireless device. The network node is configured to extract the identifier from the WLAN message. The network node is also configured to obtain information representing the identity of the wireless device in the cellular radio communication network based on the identifier.

According to a sixth aspect, there is provided a network node configured to assist in the exchange of information related to a wireless device between at least two different types of wireless networks including a Wireless Local Area Network, WLAN, and a cellular radio communication network. The network node is configured to receive an identifier of the wireless device valid in the cellular radio communication network, before association of the wireless device in the WLAN or when the network node is being contacted by the wireless device for association in the WLAN. The network node is configured to receive the identifier of the wireless device valid in the cellular radio communication network in a WLAN message from the wireless device. The network node is also configured to extract the identifier from the WLAN message. The network node is further configured to assist in the exchange of information related to the wireless device between the WLAN and the cellular radio communication network based on the identifier.

According to a seventh aspect, there is provided a computer program comprising instructions, which when executed by at least one processor, cause the at least one processor to:
  insert an identifier, representing the identity of a wireless device in a cellular radio communication network, in a message to be sent to a network node in a Wireless Local Area Network, WLAN; and
  prepare the message including the identifier for transfer to the network node in the WLAN as part of the pre-association or association signaling of the WLAN.

According to an eighth aspect, there is provided a computer program comprising instructions, which when executed by at least one processor, cause the at least one processor to:
  read a message comprising an identifier, representing the identity of a wireless device in a cellular radio communication network, wherein the message is part of the pre-association or association signaling of a Wireless Local Area Network, WLAN;
  extract the identifier from the message; and
  obtain information representing the identity of the wireless device in the cellular radio communication network based on the identifier.

According to a ninth aspect, there is provided a computer program comprising instructions, which when executed by at least one processor, cause the at least one processor to:
  read a message comprising an identifier, representing the identity of a wireless device in a cellular radio communication network, wherein the message is part of the pre-association or association signaling of a Wireless Local Area Network, WLAN;
extract the identifier from the message; and
assist in the exchange of information between the WLAN and the cellular radio communication network based on the identifier.

According to a tenth aspect, there is provided a computer program product comprising a computer-readable medium having stored thereon a computer program of any of the seventh, eighth or ninth aspects.

According to an eleventh aspect, there is provided a wireless device for operation in a wireless communication environment. The wireless device comprises:
an inserting module for inserting an identifier, representing the identity of a wireless device in a cellular radio communication network, in a message to be sent to a network node in a Wireless Local Area Network, WLAN; and
a preparation module for preparing the message, including the identifier, for transfer to the network node in the WLAN as part of the pre-association or association signaling of the WLAN.

According to a twelfth aspect, there is provided a network node for operation in a Wireless Local Area Network, WLAN, and for identifying a wireless device being attached to a cellular radio communication network. The network node comprises:
a reading module for reading a message comprising an identifier, representing the identity of a wireless device in a cellular radio communication network, wherein the message is part of the pre-association or association signaling of a Wireless Local Area Network, WLAN;
an extraction module for extracting the identifier from the message; and
an obtaining module for obtaining information representing the identity of the wireless device in the cellular radio communication network based on the identifier.

According to a thirteenth aspect, there is provided a network node for assisting in the exchange of information related to a wireless device between at least two different types of wireless networks including a Wireless Local Area Network, WLAN, and a cellular radio communication network. The network node comprises:
a reading module for reading a message comprising an identifier, representing the identity of a wireless device in a cellular radio communication network, wherein the message is part of the pre-association or association signaling of a Wireless Local Area Network, WLAN;
an extraction module for extracting the identifier from the message; and
an assisting module for assisting in the exchange of information between the WLAN and the cellular radio communication network based on the identifier.

At least one embodiment of the proposed technology enables early identification of a wireless device, being attached to a cellular radio communication network, in a WLAN network and/or provides an efficient way of assisting in the exchange of information related to the wireless device between the networks.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of an example of wireless communication environment based on different types of networks.

Figure 1:
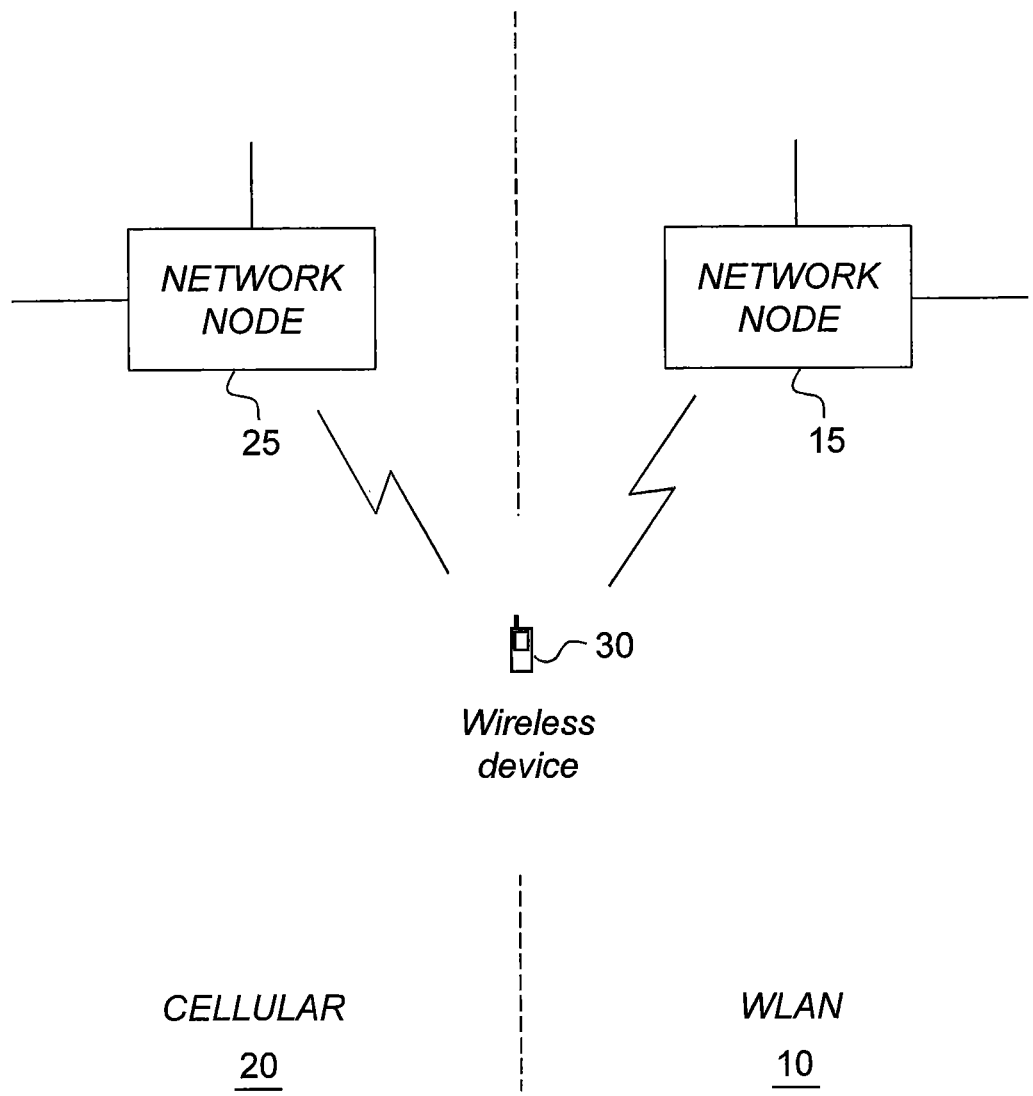
FIG. 1 is a schematic diagram illustrating an example of wireless communication environment based on at least two different types of networks.

FIG. 1 is a schematic diagram illustrating an example of wireless communication environment based on at least two different types of networks including a Wireless Local Area Network, WLAN, 10 and a cellular radio communication network 20. The cellular network may 20 include one or more network nodes 25 such as one or more base stations and/or network controllers. The WLAN 10 may include one or network nodes 15 such as one or more access points and/or access controllers. For simplicity, mainly the radio access part of the networks is illustrated. As the skilled person understands, the illustrated network nodes 15, 25 may be connected to other parts of the overall communication system. A wireless device 30 may be communicating within the cellular network and/or the WLAN. By way of example, the wireless device 30, such as a mobile terminal, UE, and/or mobile station may initially be served by the cellular network 20. Potentially, the wireless device 30 may be off-loaded to the WLAN 10, if appropriate from a radio access and/or load related perspective. The wireless device 30 may be in communication with both networks, although just being served by one of the networks. For example, while being served by the cellular network 20, the wireless device may contact the WLAN 10, e.g. by sending probe and/or association requests to the WLAN. Depending on the situation, the wireless device 30 may be 'handed over' from the cellular network 20 to the WLAN 10, or vice versa.

As used herein, the non-limiting terms "wireless device", "user equipment" and "mobile station" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" should be interpreted as non-limiting terms comprising any type of wireless device communicating with a radio network node in a radio communication system or any device equipped with radio circuitry for wireless communication according to any relevant standard for communication within a wireless communication system.

As used herein, the non-limiting term "network node" may refer to base stations, access points, network control nodes such as network controllers, radio network controllers, base station controllers, access controllers and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Figure 2:
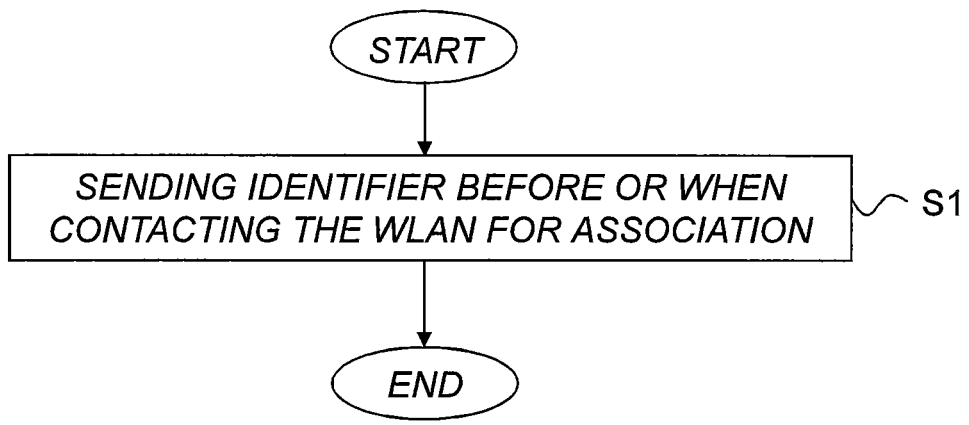
FIG. 2 is a schematic flow diagram illustrating an example of a method of enabling identification of a wireless device in a wireless communication environment according to an embodiment.

FIG. 2 is a schematic flow diagram illustrating an example of a method of enabling identification of a wireless device in a wireless communication environment according to an embodiment. The wireless device is being attached to a cellular radio communication network. The method comprises the step S1 of the wireless device sending, to a network node in a Wireless Local Area Network, WLAN, an identifier of the wireless device valid in the cellular radio communication network before or when contacting the WLAN for association of the wireless device in the WLAN. The identifier of the wireless device valid in the cellular radio communication network is signaled in a WLAN message to the network node in the WLAN.

This enables early identification of a wireless device, being attached to a cellular radio communication network, in a WLAN network. The identifier of the wireless device valid in the cellular radio communication network can be communicated to the WLAN early in the connection procedure. In this way, the amount of signaling and/or processing for identification of the wireless device can also be reduced.

The inventors have recognized the possibility of locating the identifier in a vendor-specific information field in the WLAN message, or in a new information field included in the WLAN message.

In an optional embodiment, the identifier of the wireless device valid in the cellular radio communication network is therefore located in a vendor-specific information field in the WLAN message.

In another optional embodiment a new information field is created and included in the WLAN message. This new information element can at least carry an identifier of the wireless device valid in the cellular radio communication network.

By way of example, the WLAN message is part of the pre-association or association signaling for the WLAN.

For example, the WLAN message may be a Probe Request message, an Association Request message, a Generic Advertisement Service, GAS, message and/or an Access Network Query Protocol, ANQP, message.

In an optional embodiment, the cellular radio communication network is a communication network operating according to a 3rd Generation Partnership Project, 3GPP, standard, and the identifier is a 3GPP identifier related to the wireless device.

In another embodiment, the WLAN message includes both an identifier of the wireless device valid in the WLAN and the identifier of the wireless device valid in the cellular radio communication network. For example, the identifier of the wireless device valid in the WLAN may be the MAC address.

As an example, the identifier of the wireless device valid in the cellular radio communication network includes information representative of the identity of the wireless device on the mobility management level or the identity of the wireless device on the radio access network level.

By way of example, the identifier of the wireless device valid in the cellular radio communication network includes at least one of:
 a 3GPP Global Unique Temporary Identifier, GUTI;
 a Mobility Management Entity, MME, identifier and a MME-Temporary Mobile Subscriber Identity, M-TMSI; and
 a Cell Radio Network Temporary Identifier, C-RNTI and optionally also a cell identity of a serving cell of the wireless device in the cellular radio communication network.

Figure 3:
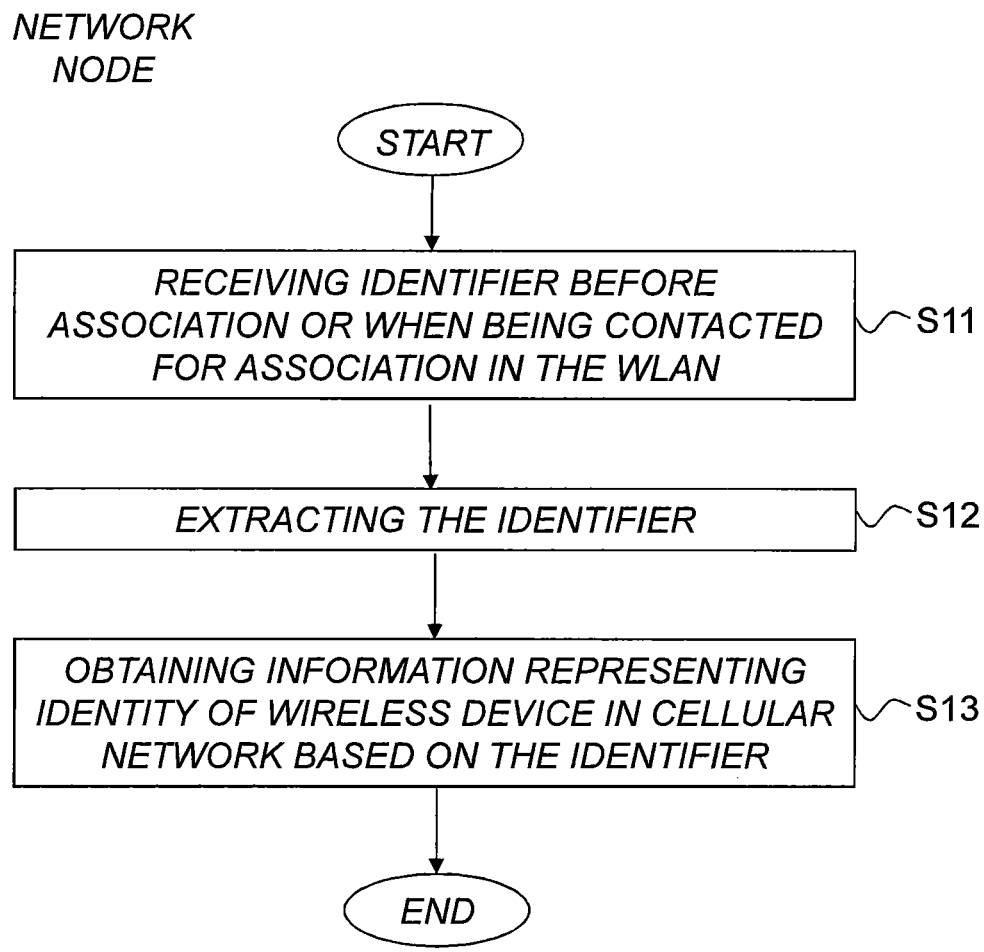
FIG. 3 is a schematic flow diagram illustrating an example of a method of identifying a wireless device in a wireless communication environment according to an embodiment.

FIG. 3 is a schematic flow diagram illustrating an example of a method of identifying a wireless device in a wireless communication environment according to an embodiment. The wireless device is being attached to a cellular radio communication network. The method comprises the step S11 of a network node in a Wireless Local Area Network, WLAN, receiving an identifier of the wireless device valid in the cellular radio communication network, wherein the identifier is received before association of the wireless device in the WLAN or when the network node is being contacted by the wireless device for association in the WLAN. The identifier of the wireless device valid in the cellular radio communication network is received in a WLAN message from the wireless device. The method also comprises the step S12 of the network node extracting the identifier from the WLAN message. The method further comprises the step S13 of the network node obtaining information representing the identity of the wireless device in the cellular radio communication network based on the identifier.

This enables early identification of a wireless device, being attached to a cellular radio communication network, in a WLAN network. The WLAN network node may obtain the identity of the wireless device in the cellular radio communication network early in the communication procedure.

In an optional embodiment, the identifier of the wireless device valid in the cellular radio communication network is located in a vendor-specific information field in the WLAN message. In this case, the identifier is extracted from this information field.

By way of example, the WLAN message is part of the pre-association or association signaling for the WLAN.

For example, the WLAN message may be a Probe Request message, an Association Request message, a Generic Advertisement Service, GAS, message and/or an Access Network Query Protocol, ANQP, message.

In an optional embodiment, the cellular radio communication network is a communication network operating according to a 3rd Generation Partnership Project, 3GPP, standard, and the identifier is a 3GPP identifier related to the wireless device.

In another embodiment, the WLAN message includes both an identifier of the wireless device valid in the WLAN and the identifier of the wireless device valid in the cellular radio communication network. For example, the identifier of the wireless device valid in the WLAN may be the MAC address.

As an example, the identifier of the wireless device valid in the cellular radio communication network includes information representative of the identity of the wireless device on the mobility management level or the identity of the wireless device on the radio access network level.

By way of example, the identifier of the wireless device valid in the cellular radio communication network includes at least one of:
  a 3GPP Global Unique Temporary Identifier, GUTI;
  a Mobility Management Entity, MME, identifier and a MME-Temporary Mobile Subscriber Identity, M-TMSI; and
  a Cell Radio Network Temporary Identifier, C-RNTI and optionally also a cell identity of a serving cell of the wireless device in the cellular radio communication network.

Figure 4:
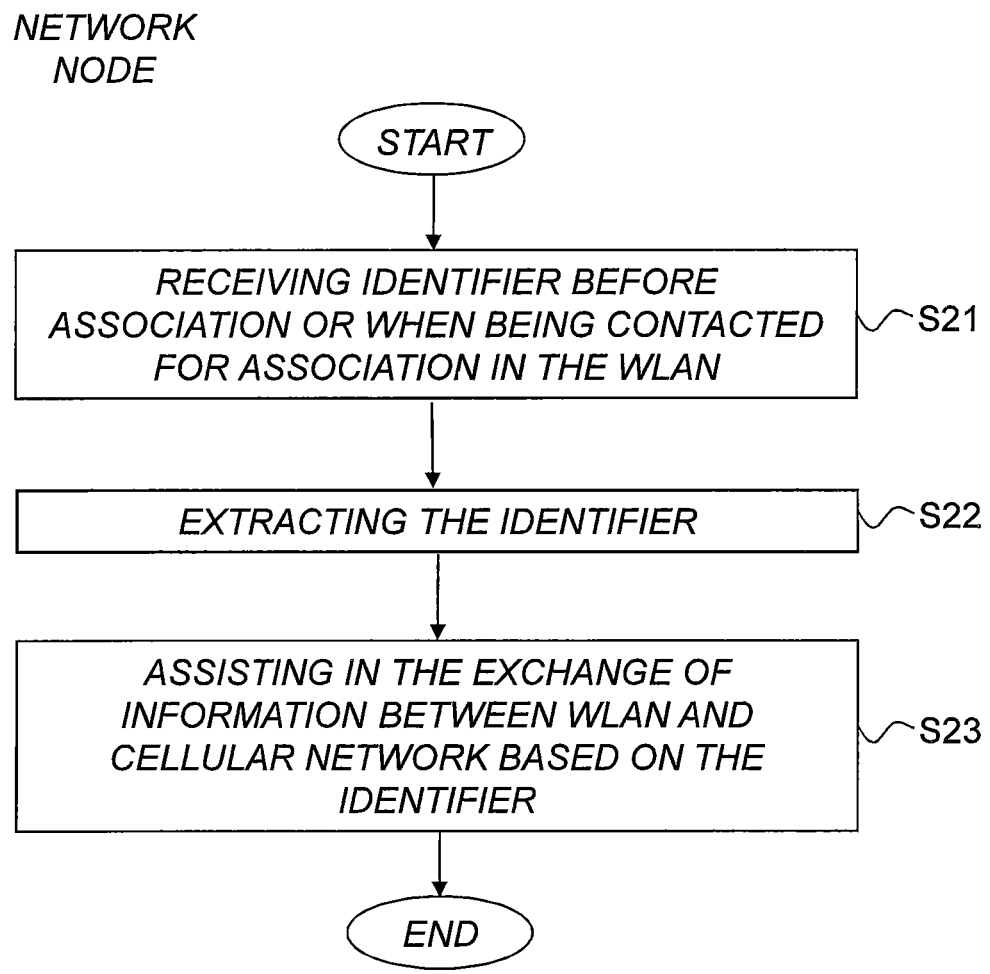
FIG. 4 is a schematic flow diagram illustrating an example of a method for assisting in the exchange of information related to a wireless device between at least two different types of wireless networks according to an embodiment.

FIG. 4 is a schematic flow diagram illustrating an example of a method for assisting in the exchange of information related to a wireless device between at least two different types of wireless networks according to an embodiment. The different types of wireless networks includes a Wireless Local Area Network, WLAN, and a cellular radio communication network. The method comprises the step S21 of a network node in the WLAN receiving an identifier of the wireless device valid in the cellular radio communication network, wherein the identifier is received before association of the wireless device in the WLAN or when the network node is being contacted by the wireless device for association in the WLAN. The identifier of the wireless device valid in the cellular radio communication network is received in a WLAN message from the wireless device. The method also comprises the step S22 of the network node extracting the identifier from the WLAN message. The method further comprises the step S23 of the network node assisting in the exchange of information between the WLAN and the cellular radio communication network based on the identifier.

This provides an efficient way of assisting in the exchange of information related to the wireless device between the networks. By way of example, this allows exchange of information between the networks to be initiated early in the connection procedure.

In an optional embodiment, the identifier of the wireless device valid in the cellular radio communication network is located in a vendor-specific information field in the WLAN message. In this case, the identifier is extracted from this information field.

By way of example, the WLAN message is part of the pre-association or association signaling for the WLAN.

For example, the WLAN message may be a Probe Request message, an Association Request message, a Generic Advertisement Service, GAS, message and/or an Access Network Query Protocol, ANQP, message.

In an optional embodiment, the cellular radio communication network is a communication network operating according to a 3rd Generation Partnership Project, 3GPP, standard, and the identifier is a 3GPP identifier related to the wireless device.

In another embodiment, the WLAN message includes both an identifier of the wireless device valid in the WLAN and the identifier of the wireless device valid in the cellular radio communication network. For example, the identifier of the wireless device valid in the WLAN may be the MAC address.

As an example, the identifier of the wireless device valid in the cellular radio communication network includes information representative of the identity of the wireless device on the mobility management level or the identity of the wireless device on the radio access network level.

By way of example, the identifier of the wireless device valid in the cellular radio communication network includes at least one of:
  a 3GPP Global Unique Temporary Identifier, GUTI;
  a Mobility Management Entity, MME, identifier and a MME-Temporary Mobile Subscriber Identity, M-TMSI; and
  a Cell Radio Network Temporary Identifier, C-RNTI and optionally also a cell identity of a serving cell of the wireless device in the cellular radio communication network.

In an optional embodiment, with reference to the example of FIG. 1, the WLAN network node 15 contacts a network node 25 of the cellular radio communication network 20 for exchange of information related to the wireless device 30 between the WLAN 10 and the cellular radio communication network 20 based on the identifier to enable coordination of information related to the wireless device between the different types of networks.

As an example, information valid for the wireless device in the cellular radio communication network is requested from the cellular radio communication network, or information valid for the identified wireless device in the WLAN is transferred to the cellular radio communication network.

For example, the information may be related to or used for access selection, mobility, traffic steering and/or access point association.

By way of example, the information may be context information related to the wireless device, radio-access related information, or information related to resources, load, or other conditions for the wireless device in the WLAN and/or the cellular radio communication network.

In an optional embodiment, context information related to the wireless device and/or radio access related information is requested from a network node of the cellular radio communication network for enabling access selection, mobility decision, traffic steering and/or access point association.

Figure 5:
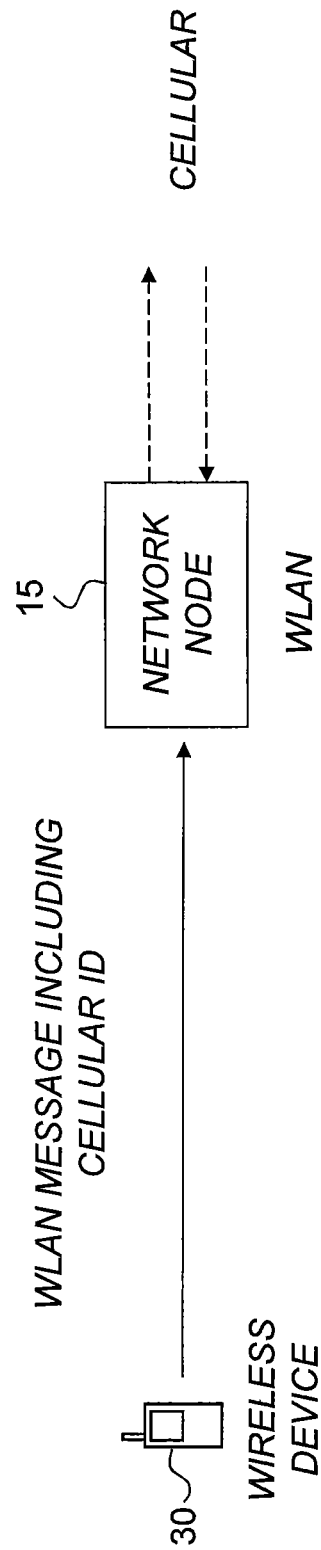
FIG. 5 is a schematic signaling diagram illustrating an example of signaling between a wireless device and a network node in a WLAN network according to an embodiment.

FIG. 5 is a schematic signaling diagram illustrating an example of signaling between a wireless device and a network node in a WLAN network according to an embodiment. In this particular example, a wireless device 30 sends a WLAN message including a cellular ID of the wireless device to a network node 15 in a WLAN. The WLAN message may be part of the pre-association or association signaling. The WLAN network node 15 receives the WLAN message and extracts the cellular ID from the message. In this way, the network node in the WLAN obtains information about the identity of the wireless device in the cellular network, which may be used for assisting in the exchange of information between the WLAN and the cellular network.

For a better understanding of the proposed technology, it may be useful to describe some non-limiting example embodiments. Reference can be made to the schematic example diagrams of FIG. 6 and FIG. 7.

In the following, reference will be made to 3GPP networks, but it should be understood that the proposed technology is applicable to any cellular radio communication network.

Although reference will mainly be made to a "UE" from a 3GPP perspective and a "STA" from a WLAN perspective, it should be understood that the terms "UE", "STA", and "wireless device" can be used interchangeably.

In state of the art solutions for 3GPP/WLAN interworking, the common identifier used to relate the UE context in the 3GPP domain to the UE context in the WLAN domain is the IMSI. However, in order to obtain the IMSI of a UE in WLAN, the UE needs to perform an EAP-SIM/AKA/AKA' authentication, which means that the link between the UE context in 3GPP and WLAN does not exist before the initiation of the EAP authentication. Furthermore, using IMSI frequently might lead to compromised user privacy.

Figure 6:
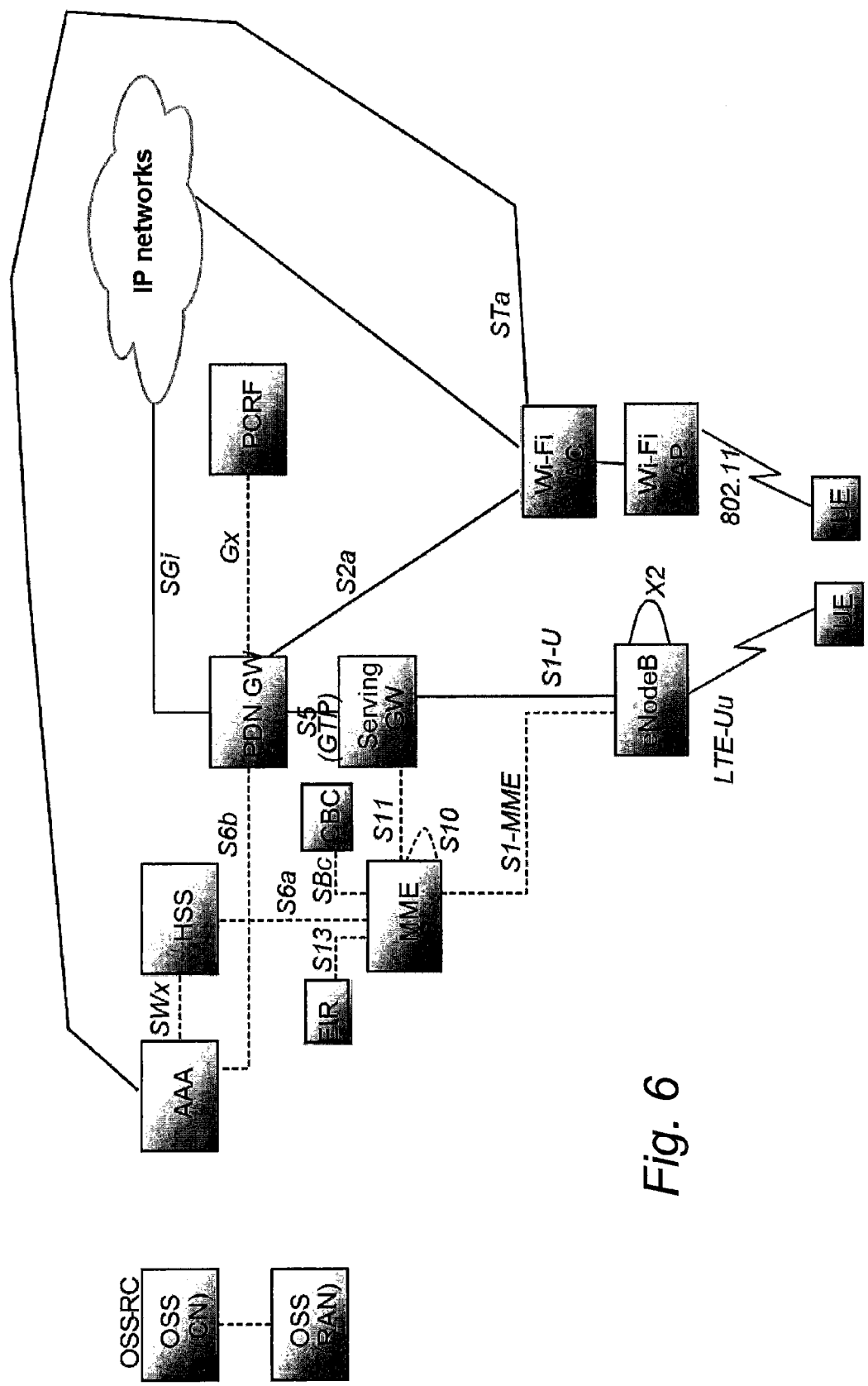
FIG. 6 is a schematic diagram illustrating an example of a network architecture of an E-UTRAN network including Wi-Fi integration.

FIG. 6 shows the network architecture for E-UTRAN and EPC and how the eNodeB is connected via the S1-interfaces, S1-MME and S1-U to the MME and Serving GW respectively. It also shows how the Wi-Fi access network is connected to the PDN-GW via the S2a interface and to the 3GPP AAA Server via the STa interface. It should be noted that the configuration of the Wi-Fi network is only an illustrative example and that the Wi-Fi network may be configured or arranged in several other ways and may comprise several further network nodes or entities. For example, the Wi-Fi network may also include a Broadband Network Gateway (BNG). In another example, the Wi-Fi AP may be co-located with a Residential Gateway (RG). In a further example, the Wi-Fi network may also comprise a Trusted WLAN Access Gateway (TWAG). In addition, the interface between the Wi-Fi AC and the PDN GW, i.e. the S2a interface, may also be implemented between the PDN GW and for example either the BNG or the RG.

Wi-Fi integration into Radio Access Network (RAN) is also emerging as an interesting study object. There are basically two different possible levels that could be implemented either separately or together. A first level of integration is to combine both 3GPP and Wi-Fi in the small pico base stations to gain access to the Wi-Fi sites with 3GPP technology and vice versa. The second level of integration, is to integrate the Wi-Fi access tighter into the RAN by introducing enhanced network controlled traffic steering between 3GPP and Wi-Fi based on knowledge about the total situation on the different accesses.

The driver for this second level of integration is to avoid potential issues with UE controlled Wi-Fi selection such as selecting Wi-Fi when the Wi-Fi connection is bad or when the UE is moving, thus giving better end user performance and better utilization of the combined Wi-Fi and cellular radio network resources.

The current methods for integration of Wi-Fi into 3GPP network described earlier do not offer good support for network controlled Wi-Fi/3GPP access selection and service mapping taking into consideration of radio access related input parameters such as UE mobility, 3GPP/Wi-Fi cell and network load, radio link performance etc.

In order to achieve this functionality it is required to link (or connect) the UE context in the 3GPP RAN (which holds information about radio performance, UE mobility etc. on the 3GPP side) with the UE context in the Wi-Fi network. This can then enable a network entity to take decisions whether the UE should access the Wi-Fi network or not depending on if the UE is stationary, and/or has a good connection to the Wi-Fi AP and so forth. The decision can then be signaled to the UE or executed internally in the 3GPP/Wi-Fi network (e.g. to control UE admission to Wi-Fi).

Mechanisms have been introduced for allowing the UE to perform authentication towards the Wi-Fi network using (U)SIM credentials and identities (IMSI) as part of the EAP-SIM/AKA/AKA' protocol signalling. This means that there is a common identity (the IMSI) available in both 3GPP and Wi-Fi sides. The main principle for solutions based on IMSI would be that the current serving 3GPP RAN node updates a UE database with the association IMSI and serving 3GPP RAN node (partly similar to the UE Location Function described as part of the current invention). When the legacy UE attempts to access the Wi-Fi side, the Wi-Fi network contacts the UE database to retrieve information about current RAN node for the UE and IMSI is used as the main key in this query. Once the Wi-Fi side retrieves information about the RAN node, communication between the radio accesses is enabled and information on both sides can be combined to make the optimal mobility decision. As mentioned earlier the mobility decision can be taken either at the non-3GPP access side, at the current 3GPP RAN node serving the UE, or at a more central function that also collects the information needed for the mobility decision.

Figure 7:
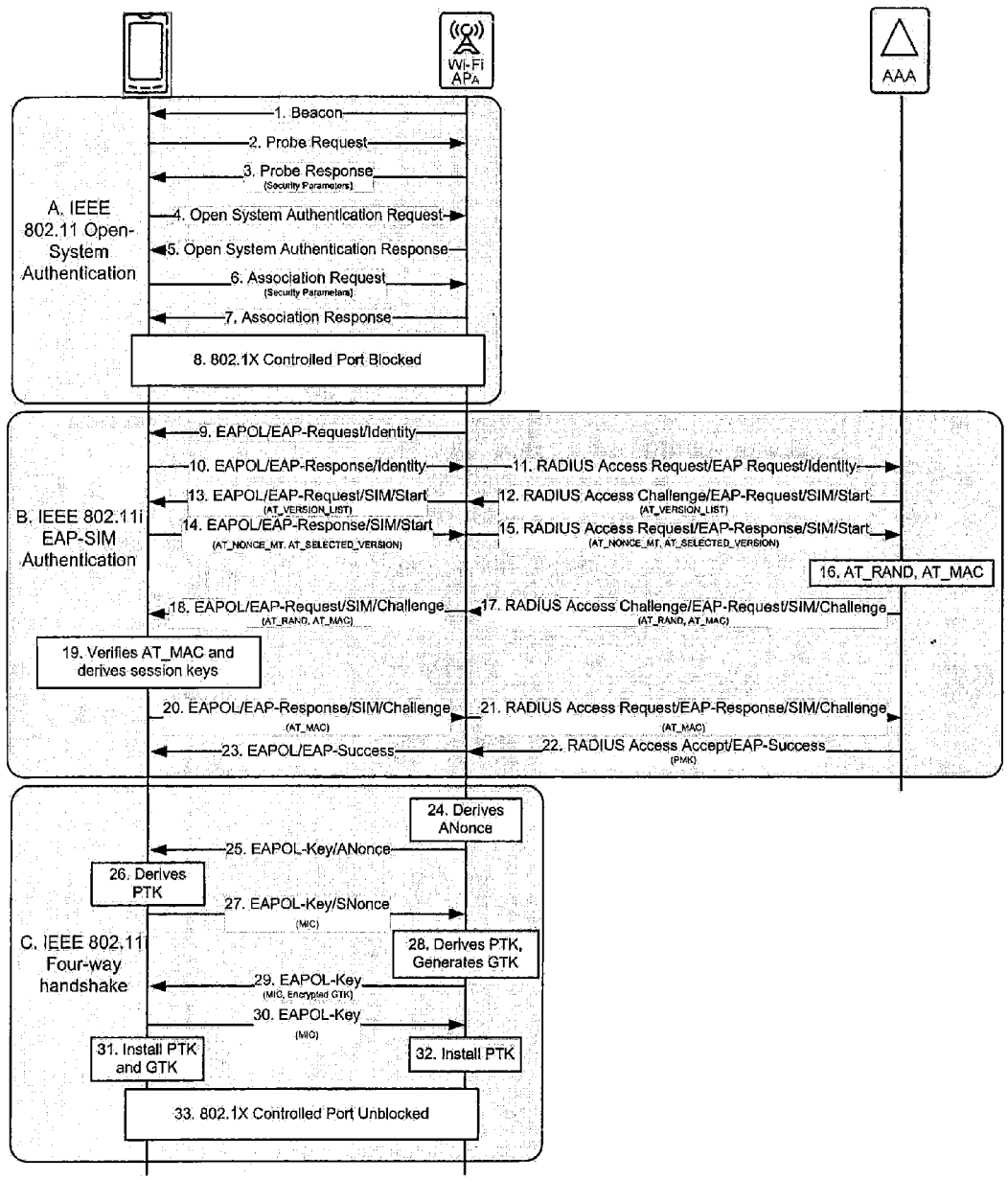
FIG. 7 is a schematic diagram illustrating an example of a WLAN connection procedure including authentication.
Figure 8:
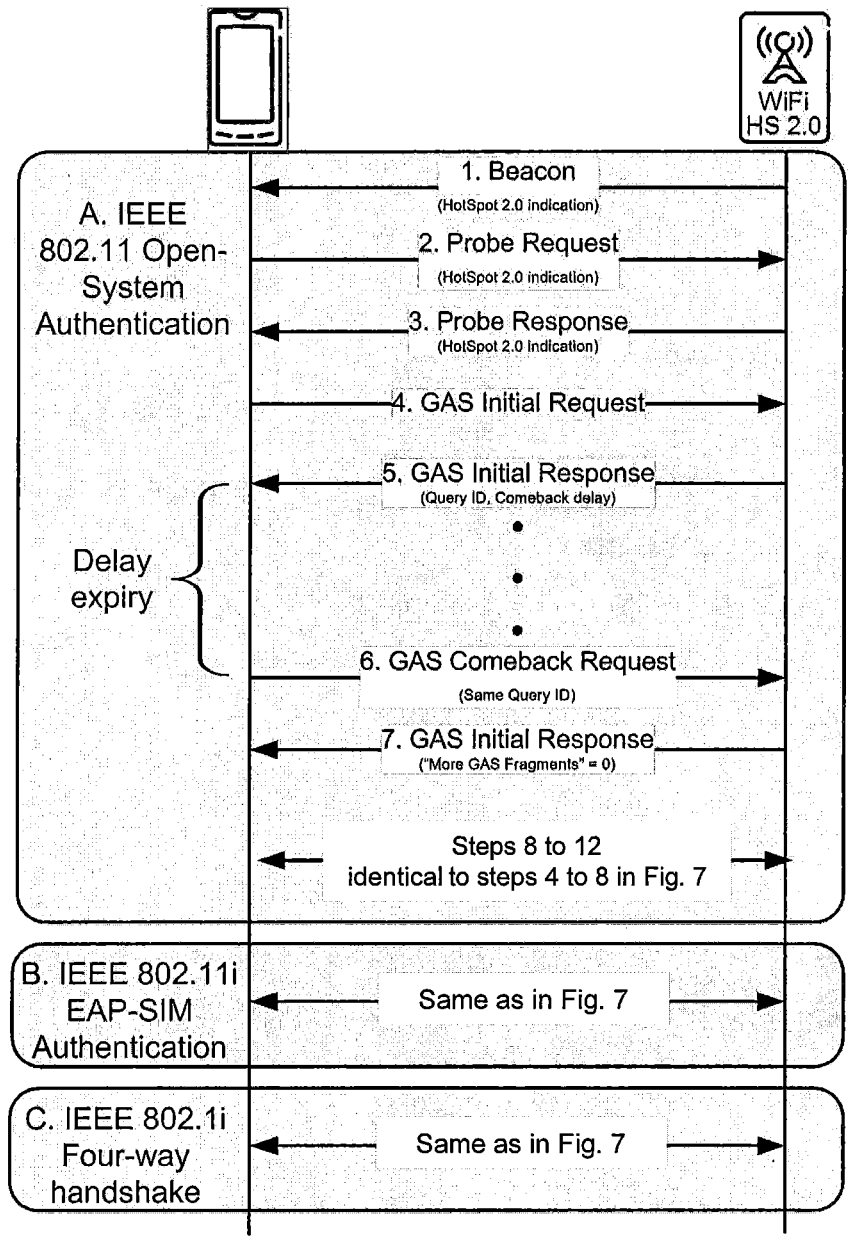
FIG. 8 is a schematic diagram illustrating an example of ANQP signaling in the connection procedure.

The WLAN connection procedure for a STA is depicted in FIG. 7.

The procedure comprises the following steps:

1 The STA receives a Beacon frame revealing (among other parameters) the security features associated with the ESS the AP belongs to. The format of the beacon frame as well as all the information elements it carries are described in Chapter 8.3.3.2 of *IEEE* 802.11;

2 If the STA does not receive a Beacon frame for some reason, it can generate a Probe Request and send it to the AP. This procedure is called active scanning and by performing it, the STA can receive from the AP the same information as it would have from a Beacon message. The Probe Request frame is described in Chapter 8.3.3.9 of *IEEE* 802.11;

3. The AP answers with Probe Response—*IEEE* 802.11, Chapter 8.3.3.10;

a. NOTE: The discovery procedure consists of either step 1 or steps 2 and 3 (i.e., receiving a Beacon frame and exchanging probe messages are mutually exclusive);

4 The STA sends an Open System Authentication Request as defined in Chapter 11.2.3.2 of *IEEE* 802.11;

5 The AP responds with an Open System Authentication Response;
6 The STA then sends an Association Request, indicating the security parameters to be used later;
7 The AP responds with an Association Response
a. NOTE: The Open System Authentication does not provide any security. The connection between the STA and the AP is secured at a later point, by means of Authentication and Key Agreement procedure. Nevertheless, a possible attack altering the security parameters in the Open System Authentication message exchange will be detected at the stage of key derivation;
8 At this point the Open System Authentication is completed and the STA can communicate only with the AP—the rest of the traffic is blocked by the port-based network control (PBNC) enforcer, as defined in *IEEE* 802.1X. Some of the traffic towards external hosts, however, can be forwarded by the AP, as in the case of the communication with the RADIUS server;
9 This step is the first step of the EAP-SIM authentication RFC 4186. The AP encapsulates an EAP-Request of Type 18 (SIM) inside an EAPOL (EAP over LAN) frame, asking the STA to report its identity. In the case when the STA is equipped with a SIM, the identity is the IMSI, followed by the "@" sign and the home realm. It is also possible for the STA to include an additional "1" in front of the IMSI in order to indicate preference for the exclusive use of EAP-SIM if other EAP methods are available (e.g., EAP-AKAe);
10 The STA responds with its identity. An example of such is:
1234580123000100@wlan.mnc048.mcc264.3gppnetwork.org (and IMSI is in this example 234580123000100 and the preceding "1" indicates the preference to use EAP-SIM);
11 The AP extracts the EAP-Response message, encapsulates it in a RADIUS frame and forwards it to the backend AAA server. The handling of EAP frames over RADIUS is described by the IETF in *RFC* 3579;
12 The AAA server recognizes the EAP method and sends an EAP-Request/SIM/Start, indicating that an EAP-SIM procedure has been initiated for that Supplicant. It also includes the list of supported SIM versions in the message as described in Chapter 10.2 of *RFC* 4186;
13 The AP relays the EAP-Request/SIM/Start message to the STA;
14 The STA responds with EAP-Response/SIM/Start message, which carries a random number (NONCE_MT) carried in the AT_NONCE_MT attribute (a randomly selected number), as well as the selected EAP-SIM version (AT_SELECTED_VERSION);
15 The AP forwards the EAP-Response/SIM/Start to the AAA server;
16 The AAA server obtains the GSM triplet (RAND, SRES and Kc) from the HLR/AuC and derives the keying material as specified in Chapter 7 of *RFC* 4186. The GSM triplet consists of:
a. RAND—a 128-bit random number, generated by the Authentication Center (an entity within the GSM core network, used to authenticate subscribers at the point of initial attach) when a subscriber authentication is requested. Its main use is for the derivation of the Signed Response (SRES) and the Kc;
b. SRES—a 32-bit variable, the expected response from the mobile station/STA after it has been challenged with the RAND;
c. Kc—a 64-bit ciphering key, used to encipher and decipher data transmitted between the STA and the AP;

17 The AAA generates an EAP-Request/SIM/Challenge message, including RAND challenges and message authentication code attribute (AT_MAC). The AT_MAC derivation is based on the RAND and Kc values;
18 The AP forwards the EAP-Request/SIM/Challenge message to the STA;
19 The STA feeds the received RAND into the GSM algorithms running on the SIM and the output is a copy of the AT_MAC and a SRES value. The first thing for the STA to do is to check whether the AT_MAC value received by the AAA (relayed by the AP) and the one generated by the SIM match. If so the STA continues with the authentication, otherwise it responds with an EAP-Response/SIM/Client-Error message. The second thing is to derive a new AT_MAC, based on the generated SRES;
20 The new AT_MAC is sent to the AAA server (via the AP) in an EAP-Response/SIM/Challenge message;
21 The AP forwards the EAP-Response/SIM/Challenge to the AAA server;
22 The AAA server verifies the new AT_MAC value that the STA has just sent. If the verification is successful, it sends an EAP-Success message to the AP. The message also carries keying material—Pairwise Master Key (PMK). The PMK is intended for the AP only and it is not forwarded to the STA (the STA can derive the same key autonomously since it is based on the Kc, which the SIM in the STA can compute based on the RAND);
23 The AP forwards the EAP-Success message to the STA and stores the PMK for the following Four-way handshake;
24 The AP uses the PMK to generate an Authenticator nonce (ANonce);
25 The ANonce value is sent to the STA in an EAPOL-Key message;
26 Using the received ANonce (together with the SNonce and the PMK), the STA constructs the Pairwise Temporal Key (PTK);
27 The STA sends an EAPOL-Key message to the AP, including a Supplicant nonce (SNonce) and a message integrity code (MIC);
28 The AP uses the ANonce, SNonce and the PMK to construct the PTK. The AP also uses the MIC in order to verify that the STA has computed the correct and fresh key. Furthermore, the AP also generates and installs a Group Temporal Key (GTK, which is used exclusively for the encryption and decryption of broadcast and multicast traffic;
29 The AP sends to the STA an encrypted GTK, a sequence number to use for the next broadcast message and an instruction to install the PTK (the message is integrity protected by another MIC);
30 The STA responds with an acknowledgement message;
31 The STA installs both the PTK and the GTK and as of this point uses them to encrypt and decrypt all communication;
32 The AP also installs the PTK;
33 The 802.1X Controlled Port is now open and the STA can communicate with other network hosts besides the AP.

As explained above, a mobility decision requires that both the UE context in the cellular/3GPP domain and the WLAN domain are available in order to take an optimum access selection decision. Furthermore, as discussed, the only common UE identifier in both the 3GPP and WLAN domains is the IMSI. The problem is that the IMSI is not available before the EAP authentication is initiated (i.e., step 10 above) hence the mobility decision entity needs to have the UE always perform an Open System Authentication in WLAN in order to obtain the IMSI and link the UE's context in WLAN to the one in 3GPP. This approach leads to inefficient usage, of resources: e.g., the UE could be denied access to WLAN by the mobility decision function; and even though access has been denied and the UE is not using the WLAN network, it still had to connect and send several OTA messages.

Furthermore, for security purposes most UEs nowadays will not expose their permanent identity (i.e., IMSI) in step 10, but will rather submit a temporary identity (e.g., a Pseudonym or Fast re-authentication username). This prevents the WLAN network from obtaining the permanent identity right away and implies that additional methods will be needed in order to "trick" the UE to expose its IMSI.

In an optional embodiment, it is proposed that a wireless device such as a UE/STA that is registered in a 3GPP network includes a 3GPP identifier before or when contacting the WLAN/Wi-Fi network for association. The inclusion of this identifier is preferably made as early as possible in the communication sequence to reduce the amount of signaling/processing prior to correlating, e.g. RAN related information for access selection, mobility and/or traffic steering.

In an optional embodiment, the inventors have recognized that the relation or connection between the identity used in the WLAN network and the identity used in the cellular domain may be given through explicit signaling of cellular identity information in what is referred to as a vendor-specific information field in one or more WLAN messages towards the relevant network node such as an access point, AP, and/or an access controller, AC, in the WLAN. For example this can be accomplished as early in the sequence as in the probe request, or the association request messages.

*Part 11: Wireless LAN Medium Access Control (MAC) and Physical Layer (PHY) Specifications, IEEE Standrad 802.11™-2012*, describes the following message format for the Probe request and association request respectively (not all notes information is included in the below description):

Probe Request

TABLE 1

Probe Request frame content

| Order | Information | Notes |
|---|---|---|
| 1 | SSID | |
| 2 | Supported Rates | |
| 3 | Request Information | |
| 4 | Extended Supported Rates | |
| 5 | DSSS Parameter set | |
| 6 | Supported Operating Classes | |
| 7 | HT Capabilities | |
| 8 | 20/40 BSS Coexistence | |
| 9 | Extended Capabilities | |
| 10 | SSID List | |
| 11 | Channel Usage | |
| 12 | Interworking | |
| 13 | Mesh ID | |
| Last | Vendor Specific | One or more vendor-specific elements are optionally present. These elements follow all other elements. |

Association Request

TABLE 2

Association Request frame content

| Order | Information | Notes |
|---|---|---|
| 1 | Capability | |
| 2 | Listen Interval | |
| 3 | SSID | |
| 4 | Supported Rates | |
| 5 | Extended Supported Rates | |
| 6 | Power Capability | |
| 7 | Supported Channels | |
| 8 | RSN | |
| 9 | QoS Capability | |
| 10 | RM Enabled Capabilities | |
| 11 | Mobility Domain | |
| 12 | Supported Operating Classes | |
| 13 | HT Capabilities | |
| 14 | 20/40 BSS Coexistence | |
| 15 | Extended Capabilities | |
| 16 | QoS Traffic Capability | |
| 17 | TIM Broadcast Request | |
| 18 | Interworking | |
| Last | Vendor Specific | One or more vendor-specific elements are optionally present. These elements follow all other elements. |

The vendor-specific element is used to carry information not defined in the IEEE standard within a single defined format, so that reserved element ID's are not usurped for nonstandard purposes and so that interoperability is more easily achieved in the presence of nonstandard information. The format of the vendor-specific information element or field is given in Table 3 below:

TABLE 3

Vendor specific field format

| | Element ID | Length | Organization Identifier | Vendor-specific content |
|---|---|---|---|---|
| Octets | 1 | 1 | j | n − j |

In the initial communication with an AP, for example in a probe request or an association request, the UE may insert information about cellular system/RAN identity in the vendor-specific content field to allow the AP an opportunity to make the connection between the UE identity in the WLAN world (the 48 bit MAC address) and the identity in the 3GPP world.

In an alternative embodiment, with reference to Table 1 or Table 2 above, a new information field may also be created (e.g., 14-External RAT identifier in Table 1 or 19-External RAT Identifier in Table 2) that hold the identification information of the wireless device in a similar way as described for the vendor-specific information element(s).

An example of an identity which is known to the UE and possible to include if it is a Long Term Evolution, LTE, UE is the Globally Unique Temporary Identifier, GUTI.

The GUTI is an identifier including 5 parts:
1. The MCC—3 digits
2. The MNC—2 to 3 digits
3. MME Group ID—16 bit
4. MME Code—8 bit
5. M-TMSI—Identifies the mobile With this information in the AP at the time a UE sends a probe request or an association request, it will be easy for the AP to send a request for information to the correct MME, including M-TMSI, and request information about the eNB address for the UE with the specific M-TMSI. The eNB can then be contacted for further information related to the UE.

Other identities are also possible. For example, Cell Radio Network Temporary Identifier, CRNTI, plus Cell ID in the cellular/3GPP network.

Thus, the UE/STA may include both the MAC address identifying the UE in the WLAN such as a Wi-Fi network as well as a cellular identity, for example a GUTI, in the same message. This will allow the AP to make the necessary correlation of identities and exchange any information requesting decisions on access selection, mobility, access point association and/or traffic steering from the 3GPP network or it may simply request information from the 3GPP/cellular network to make decisions about association of a UE/STA to a certain AP within the AP itself.

An advantage of using the vendor specific field possibility to transmit information that relates to cellular identification is that this information can be transferred very early in the communication sequence. Already in the probe request, or alternatively in the association request, the vendor specific content is possible to transfer and by defining, e.g., a new organization identifier or use of an already existing, it is possible to map for example GUTI or other types of 3GPP related identity information to the WLAN network node such as the AP.

As previously described, the IMSI may have disadvantages in that it is only possible to retrieve in the AP after the authentication procedures are complete. With early information it would be possible to take a decision in the AP on association and traffic steering, coordinated with the 3GPP side, already prior to communication towards the AAA, thereby adding less load on AAA for UE/STA's that anyway may be rejected.

In certain situations, the IMSI might not be the most appropriate identifier to use. For example, the 3GPP RAN does not have knowledge of the IMSI of the UE; it only knows the RAN identifiers. Hence, if a mobility decision entity needs to link the UE context from the 3GPP RAN and the WLAN, the IMSI might not serve the purpose well. Hence, another option would be to use a RAN identifier instead, such as the C-RNTI. In this way, the radio context in both 3GPP and WLAN could be found without involving too many network entities.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components. The proposed technology provides a wireless device configured for operation in a wireless communication environment. The wireless device is configured to send, to a network node in a Wireless Local Area Network, WLAN, an identifier of the wireless device valid in a cellular radio communication network before or when contacting the WLAN for association of the wireless device in the WLAN. The wireless device is configured to send the identifier of the wireless device valid in the cellular radio communication network in a WLAN message to the network node in the WLAN.

In an optional embodiment, the wireless device is configured to send the identifier in a vendor-specific information field in the WLAN message, or in a new information field included in the WLAN message.

By way of example, the wireless device is configured to send the identifier as part of the pre-association or association signaling for the WLAN.

For example, the wireless device may be configured to send the identifier in a Probe request message, an Association request message, a Generic Advertisement Service, GAS, message and/or an Access Network Query Protocol, ANQP, message.

In an optional embodiment, the cellular radio communication network is a communication network operating according to a 3rd Generation Partnership Project, 3GPP, standard, and the identifier is a 3GPP identifier related to the wireless device.

As an example, the wireless device is configured to include the identifier in the WLAN message as at least one of:
  a 3GPP Global Unique Temporary Identifier, GUTI;
  a Mobility Management Entity, MME, identifier and a MME-Temporary Mobile Subscriber Identity, M-TMSI; and
  a Cell Radio Network Temporary Identifier, C-RNTI and optionally also a cell identity of a serving cell of the wireless device in the cellular radio communication network.

Figure 9:
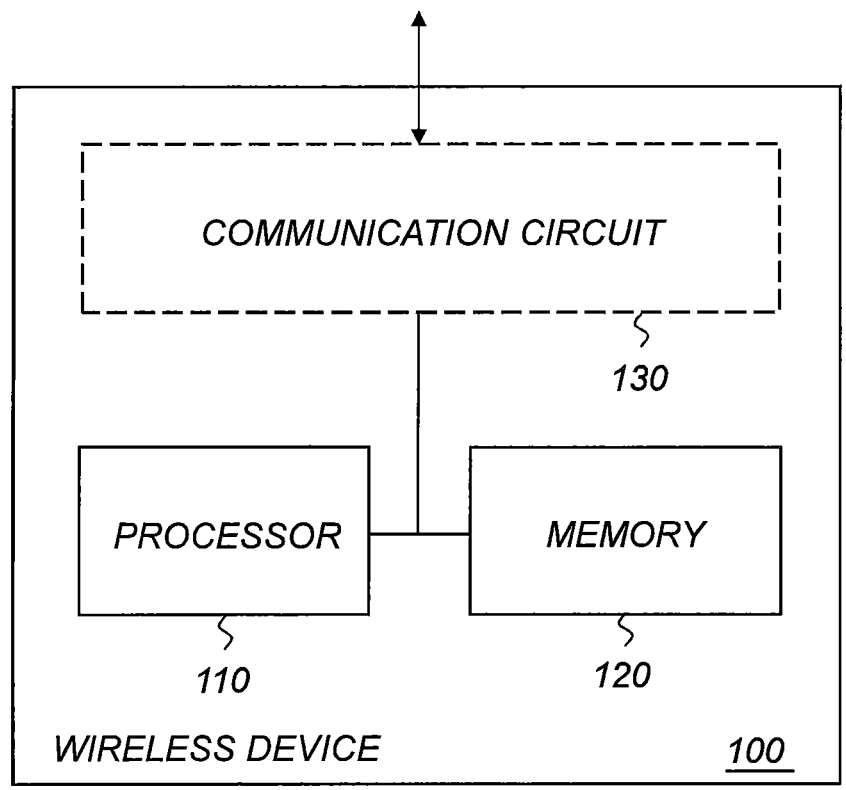
FIG. 9 is a schematic block diagram illustrating an example of a wireless device according to an embodiment.

FIG. 9 is a schematic block diagram illustrating an example of a wireless device according to an embodiment.

In the particular example of FIG. 9, the wireless device 100 comprises a processor and a memory 120, the memory comprising instructions executable by the processor, whereby the processor is operative to insert the identifier of the wireless device valid in the cellular radio communication network in the WLAN message and prepare the WLAN message for transfer to network node in the WLAN.

Optionally, the wireless device 100 may also include a communication circuit 130. The communication circuit may include functions for wireless communication with other devices and/or network nodes in the network. In a particular example, the wireless device may include radio circuitry for communication with one or more other nodes, including transmitting and/or receiving information. The communication circuit 130 may be interconnected to the processor 110 and/or memory 120.

The proposed technology also provides a network node configured for operation in a Wireless Local Area Network, WLAN, and configured to identify a wireless device being attached to a cellular radio communication network. The network node is configured to receive an identifier of the wireless device valid in the cellular radio communication network, before association of the wireless device in the WLAN or when the network node is being contacted by the wireless device for association in the WLAN. The network node is configured to receive the identifier of the wireless device valid in the cellular radio communication network in a WLAN message from the wireless device. The network node is configured to extract the identifier from the WLAN message. The network node is also configured to obtain information representing the identity of the wireless device in the cellular radio communication network based on the identifier.

In an optional embodiment, the network node is configured to receive the identifier of the wireless device valid in the cellular radio communication network in a vendor-specific information field in the WLAN message or in a new information field included in the WLAN message, and to extract the identifier from the vendor-specific information field or the new information field.

By way of example, the network node is configured to receive the identifier as part of the pre-association or association signaling for the WLAN.

For example, the network node is configured to receive the identifier in a Probe Request message, an Association Request message, a Generic Advertisement Service, GAS, message and/or an Access Network Query Protocol, ANQP, message.

In an optional embodiment, the cellular radio communication network is a communication network operating according to a 3rd Generation Partnership Project, 3GPP, standard, and the identifier is a 3GPP identifier related to the wireless device.

As an example, the identifier includes at least one of:
a 3GPP Global Unique Temporary Identifier, GUTI;
a Mobility Management Entity, MME, identifier and a MME-Temporary Mobile Subscriber Identity, M-TMSI; and
a Cell Radio Network Temporary Identifier, C-RNTI and optionally also a cell identity of a serving cell of the wireless device in the cellular radio communication network.

Figure 10:
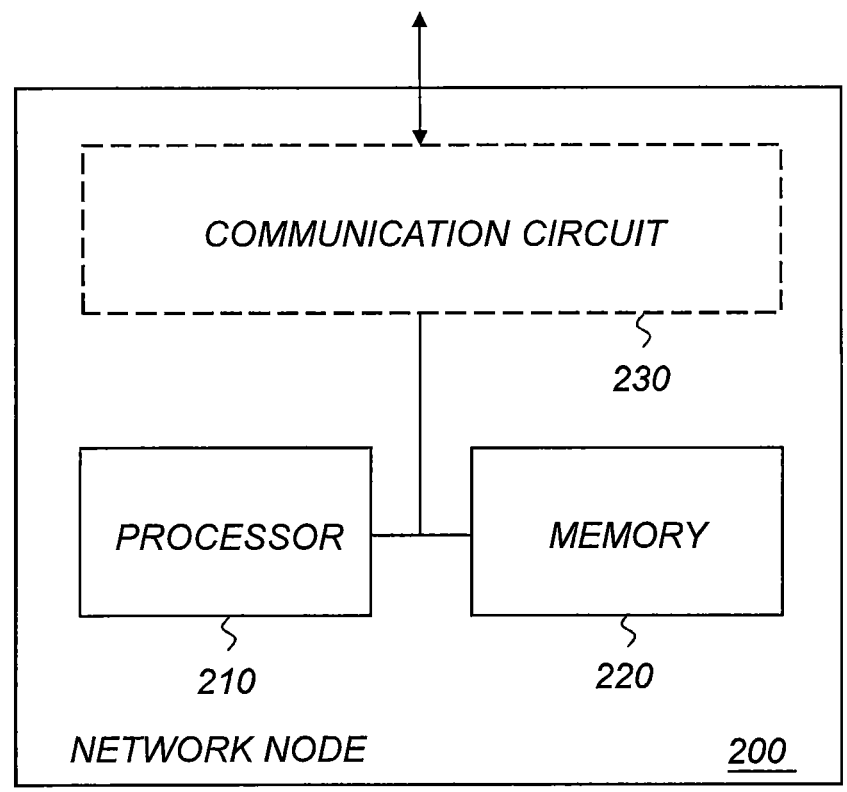
FIG. 10 is a schematic block diagram illustrating an example of a network node according to an embodiment.

FIG. 10 is a schematic block diagram illustrating an example of a network node according to an embodiment. In the particular example of FIG. 10, the network node comprises a processor 210 and a memory 220, the memory comprising instructions executable by the processor, whereby the processor is operative to identify the wireless device.

Optionally, the network node 200 may also include a communication circuit 230. The communication circuit may include functions for wired and/or wireless communication with other devices and/or network nodes in the network. In a particular example, the network node may include radio circuitry for communication with one or more other nodes, including transmitting and/or receiving information. The communication circuit 230 may be interconnected to the processor 210 and/or memory 220.

By way of example, the network node 200 may be a WLAN access point or a WLAN access controller.

Further, the proposed technology provides a network node configured to assist in the exchange of information related to a wireless device between at least two different types of wireless networks including a Wireless Local Area Network, WLAN, and a cellular radio communication network. The network node is configured to receive an identifier of the wireless device valid in the cellular radio communication network, before association of the wireless device in the WLAN or when the network node is being contacted by the wireless device for association in the WLAN. The network node is configured to receive the identifier of the wireless device valid in the cellular radio communication network in a WLAN message from the wireless device. The network node is also configured to extract the identifier from the WLAN message. The network node is further configured to assist in the exchange of information related to the wireless device between the WLAN and the cellular radio communication network based on the identifier.

In an optional embodiment, the network node is configured to receive the identifier of the wireless device valid in the cellular radio communication network in a vendor-specific information field in the WLAN message and to extract the identifier from the vendor-specific information field.

By way of example, the network node is configured to receive the identifier as part of the pre-association or association signaling for the WLAN.

For example, the network node is configured to receive the identifier in a Probe Request message, an Association Request message, a Generic Advertisement Service, GAS, message and/or an Access Network Query Protocol, ANQP, message.

In an optional embodiment, the cellular radio communication network is a communication network operating according to a 3rd Generation Partnership Project, 3GPP, standard, and the identifier is a 3GPP identifier related to the wireless device.

As an example, the identifier includes at least one of:
a 3GPP Global Unique Temporary Identifier, GUTI;
a Mobility Management Entity, MME, identifier and a MME-Temporary Mobile Subscriber Identity, M-TMSI; and
a Cell Radio Network Temporary Identifier, C-RNTI and optionally also a cell identity of a serving cell of the wireless device in the cellular radio communication network.

In an optional embodiment, the network node is configured to contact a network node 25 of the cellular radio communication network 20 for exchange of information related to the wireless device 30 between the WLAN 10 and the cellular radio communication network 20 based on the identifier to enable coordination of information related to the wireless device between the different types of networks.

For example, the network node may be configured to request information valid for the wireless device 30 in the cellular radio communication network from the cellular radio communication network 20, or transfer information valid for the wireless device 30 in the WLAN to the cellular radio communication network 20.

As an example, the information may be related to or used for access selection, mobility, traffic steering and/or access point association.

In a particular example, the information is context information related to the wireless device, radio-access related information, or information related to resources, load, or other conditions for the wireless device in the WLAN and/or the cellular radio communication network.

By way of example, the network node may be configured to request context information related to the wireless device and/or radio access related information from a network node 25 of the cellular radio communication network for enabling access selection, mobility decision, traffic steering and/or access point association.

Figure 11:
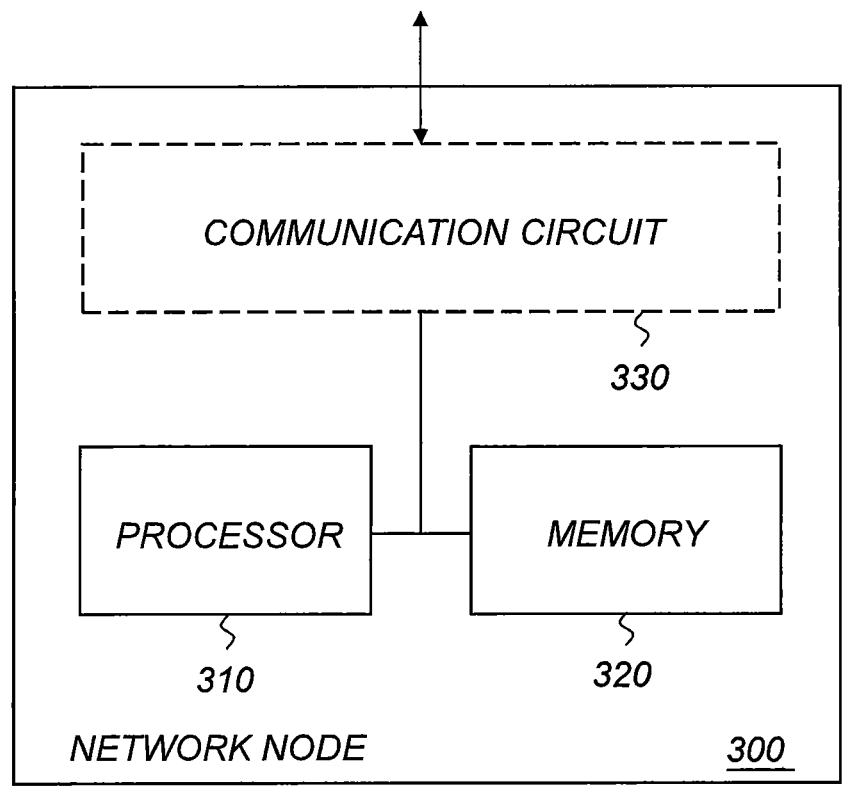
FIG. 11 is a schematic block diagram illustrating an example of a network node according to another embodiment.

FIG. 11 is a schematic block diagram illustrating an example of a network node according to another embodiment.

In the particular example of FIG. 11, the network node 300 comprises a processor and a memory 320, the memory comprising instructions executable by the processor, whereby the processor is operative to assist in the exchange of information related to the wireless device.

Optionally, the network node 300 may also include a communication circuit 330. The communication circuit may include functions for wired and/or wireless communication with other devices and/or network nodes in the network. In a particular example, the network node may include radio circuitry for communication with one or more other nodes, including transmitting and/or receiving information. The communication circuit 330 may be interconnected to the processor 310 and/or memory 320.

By way of example, the network node may be a WLAN access point or a WLAN access controller.

Figure 12:
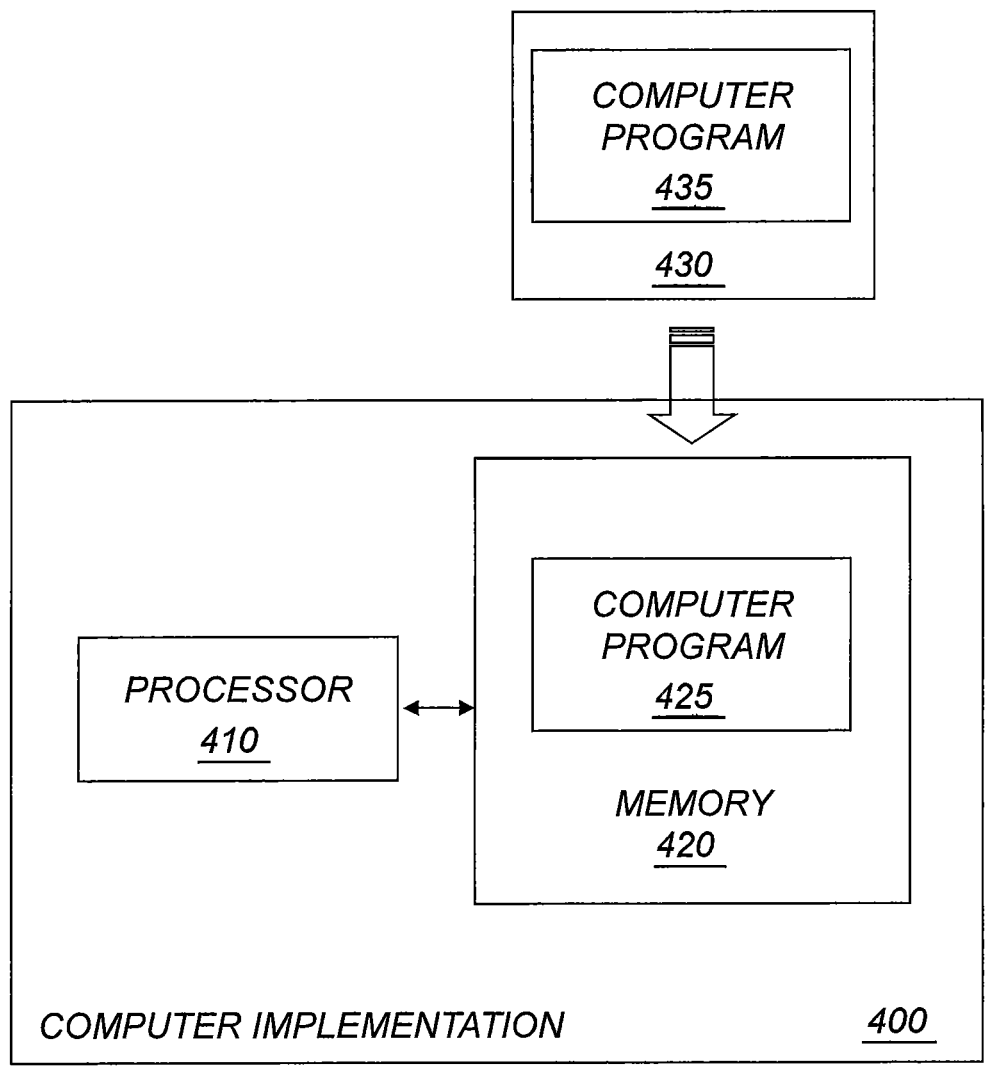
FIG. 12 is a schematic block diagram illustrating an example of a computer implementation according to an embodiment.

In a particular example, referring to the schematic example illustrated in FIG. 12, at least some of the steps, functions, procedures, modules and/or blocks described herein are implemented in a computer program 425; 435 which is loaded into the memory 420 for execution by processing circuitry including one or more processors 410. The processor(s) 410 and memory 420 of this computer-implementation 400 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, there is provided a computer program comprising instructions, which when executed by at least one processor, cause the at least one processor to:
  insert an identifier, representing the identity of a wireless device in a cellular radio communication network, in a message to be sent to a network node in a Wireless Local Area Network, WLAN; and
  prepare the message including the identifier for transfer to the network node in the WLAN as part of the pre-association or association signaling of the WLAN.

Figure 13:
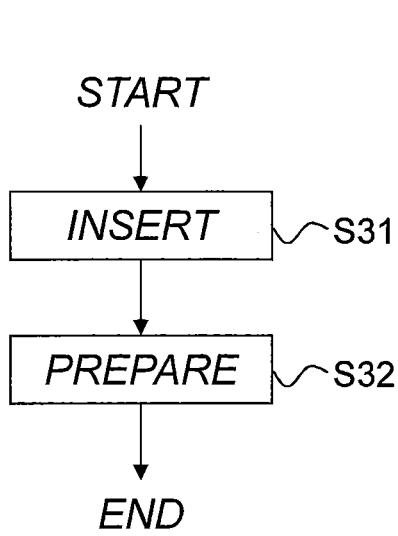
FIG. 13 is a schematic computer flow diagram according to a first example for execution by at least one processor.

Reference can also be made to the computer flow diagram of FIG. 13.

In an optional embodiment, the identifier is inserted in a vendor-specific information field in the message.

According to an eighth aspect, there is provided a computer program comprising instructions, which when executed by at least one processor, cause the at least one processor to:
  read a message comprising an identifier, representing the identity of a wireless device in a cellular radio communication network, wherein the message is part of the pre-association or association signaling of a Wireless Local Area Network, WLAN;
  extract the identifier from the message; and
  obtain information representing the identity of the wireless device in the cellular radio communication network based on the identifier.

Figure 14:
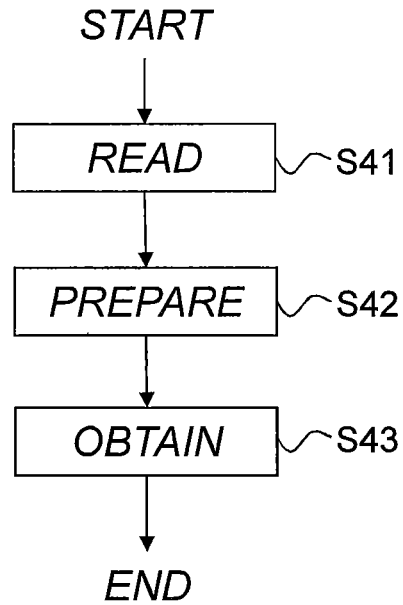
FIG. 14 is a schematic computer flow diagram according to a second example for execution by at least one processor.

Reference can also be made to the computer flow diagram of FIG. 14.

In an optional embodiment, the identifier is received in a vendor-specific information field in the message, and extracted from this information field.

According to a ninth aspect, there is provided a computer program comprising instructions, which when executed by at least one processor, cause the at least one processor to:
  read a message comprising an identifier, representing the identity of a wireless device in a cellular radio communication network, wherein the message is part of the pre-association or association signaling of a Wireless Local Area Network, WLAN;
  extract the identifier from the message; and
  assist in the exchange of information between the WLAN and the cellular radio communication network based on the identifier.

Figure 15:
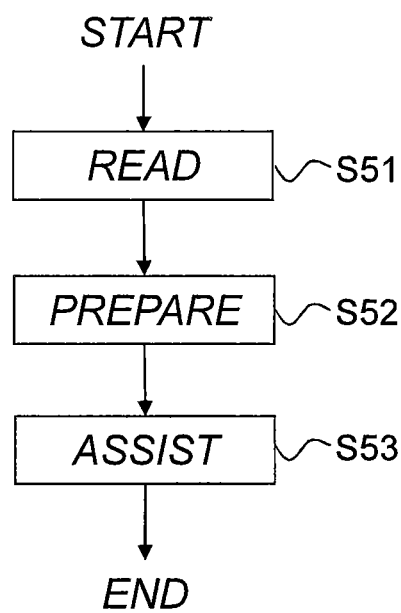
FIG. 15 is a schematic computer flow diagram according to a third example for execution by at least one processor.

Reference can also be made to the computer flow diagram of FIG. 15.

In an optional embodiment, the identifier is received in a vendor-specific information field in the message, and extracted from this information field.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In a particular example, there is provided a computer program product comprising a computer-readable medium having stored thereon a computer program as described herein.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, for example as illustrated in FIGS. 13-15, when performed by one or more processors. A corresponding apparatus, wireless device and/or network node may be defined as a group of function modules, where each step performed by the processor corresponds to a function module. In this case, the function modules are implemented as a computer program running on the processor. Hence, the apparatus, wireless device and/or network node may be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 16:
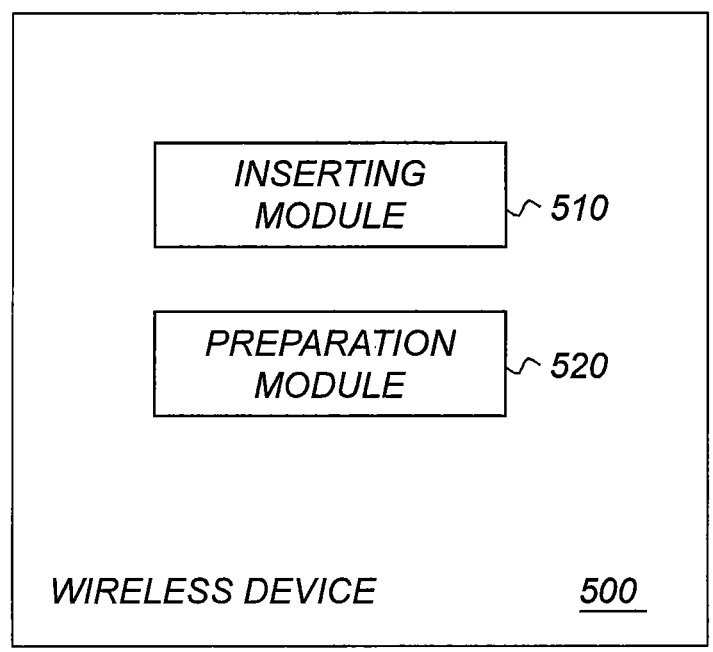
FIG. 16 is a schematic block diagram illustrating an example of a wireless device having function modules according to an embodiment.

FIG. 16 is a schematic block diagram illustrating an example of a wireless device having function modules according to an embodiment. The wireless device 500 is adapted for operation in a wireless communication environment. The wireless device 500 comprises:
- an inserting module 510 for inserting an identifier, representing the identity of a wireless device in a cellular radio communication network, in a message to be sent to a network node in a Wireless Local Area Network, WLAN; and
- a preparation module 520 for preparing the message, including the identifier, for transfer to the network node in the WLAN as part of the pre-association or association signaling of the WLAN.

In an optional embodiment, the inserting module is adapted for inserting the identifier in a vendor-specific information field in the message.

Figure 17:
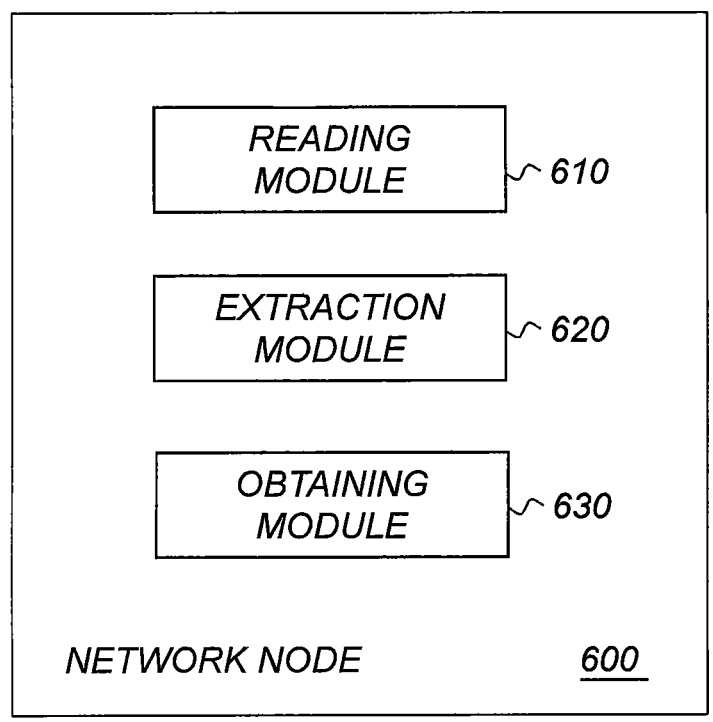
FIG. 17 is a schematic block diagram illustrating an example of a network node having function modules according to an embodiment.

FIG. 17 is a schematic block diagram illustrating an example of a network node having function modules according to an embodiment. The network node 600 is adapted for operation in a Wireless Local Area Network, WLAN, and for identifying a wireless device being attached to a cellular radio communication network. The network node 600 comprises:
- a reading module 610 for reading a message comprising an identifier, representing the identity of a wireless device in a cellular radio communication network, wherein the message is part of the pre-association or association signaling of a Wireless Local Area Network, WLAN;
- an extraction module 620 for extracting the identifier from the message; and
- an obtaining module 630 for obtaining information representing the identity of the wireless device in the cellular radio communication network based on the identifier.

In an optional embodiment, the message comprises the identifier in a vendor-specific information field, and the extraction module is adapted for extracting the identifier from the vendor-specific information field in the message.

Figure 18:
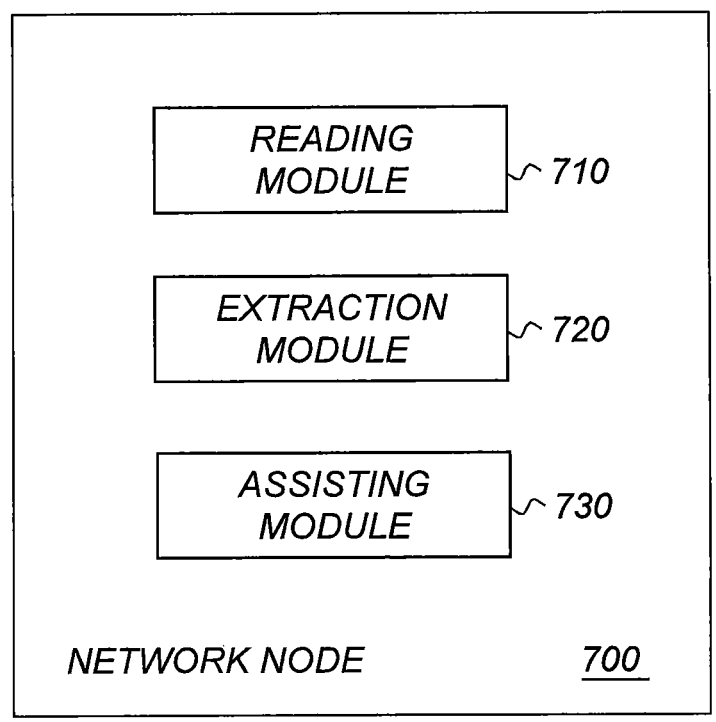
FIG. 18 is a schematic block diagram illustrating an example of a network node having function modules according to another embodiment.

FIG. 18 is a schematic block diagram illustrating an example of a network node having function modules according to another embodiment. The network node 700 is adapted for assisting in the exchange of information related to a wireless device between at least two different types of wireless networks including a Wireless Local Area Network, WLAN, and a cellular radio communication network. The network node 700 comprises:
- a reading module 710 for reading a message comprising an identifier, representing the identity of a wireless device in a cellular radio communication network, wherein the message is part of the pre-association or association signaling of a Wireless Local Area Network, WLAN;
- an extraction module 720 for extracting the identifier from the message; and
- an assisting module 730 for assisting in the exchange of information between the WLAN and the cellular radio communication network based on the identifier.

In an optional embodiment, the message comprises the identifier in a vendor-specific information field, and the extraction module is adapted for extracting the identifier from the vendor-specific information field in the message.

Alternatively it is possibly to realize the modules predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 23.402, V12.4.0
[2] IEEE 802.11-2012
[3] IEEE 802.1X-2010
[4] RFC 4186
[5] RFC 3579

The invention claimed is:

1. A method of identifying a wireless device in a wireless communication environment, the wireless device being attached to a cellular radio communication network, wherein said method comprises:
- a network node in a Wireless Local Area Network (WLAN) receiving an identifier of the wireless device valid in the cellular radio communication network, wherein the identifier is received before association of the wireless device in the WLAN,
- wherein the identifier of the wireless device valid in the cellular radio communication network is received in a WLAN message from the wireless device;
- the network node extracting the identifier from the WLAN message; and
- the network node obtaining information representing the identity of the wireless device in the cellular radio communication network based on the identifier.

2. The method of claim 1, wherein the WLAN message is a Probe Request message including the identifier valid in the cellular radio communication network, a Generic Advertisement Service (GAS) message including the identifier valid in the cellular radio communication network, and/or an Access Network Query Protocol (ANQP) message including the identifier valid in the cellular radio communication network.

3. A method for assisting in the exchange of information related to a wireless device between at least two different types of wireless networks including a Wireless Local Area Network (WLAN) and a cellular radio communication network, wherein said method comprises:
- a network node in the WLAN receiving an identifier of the wireless device valid in the cellular radio communication network, wherein the identifier is received before association of the wireless device in the WLAN,
- wherein the identifier of the wireless device valid in the cellular radio communication network is received in a WLAN message from the wireless device;
- the network node in the WLAN extracting the identifier valid in the cellular radio communication network from the WLAN message; and the network node in the WLAN assisting in the exchange of information between the WLAN and the cellular radio communication network based on the identifier valid in the cellular radio communication network;

wherein the WLAN network node contacts a network node of the cellular radio communication network for exchange of information related to the wireless device between the WLAN and the cellular radio communication network based on the identifier to enable coordination of information related to the wireless device between the different types of networks.

4. The method of claim 3, wherein information valid for the wireless device in the cellular radio communication network is requested from the cellular radio communication network by the WLAN network node, or information valid for the identified wireless device in the WLAN is transferred from the WLAN network node to the cellular radio communication network.

5. The method of claim 3, wherein the information is related to or used for access selection, mobility, traffic steering and/or access point association, wherein the information is exchanged between the WLAN network node and the network node of the cellular radio communication network.

6. The method of claim 3, wherein the information is context information related to the wireless device, radio-access related information, or information related to resources, load, or other conditions for the wireless device in the WLAN and/or the cellular radio communication network, wherein the information is exchanged between the WLAN network node and the network node of the cellular radio communication network.

7. The method of claim 3, wherein the information is context information related to the wireless device and/or radio access related information that is requested from a network node of the cellular radio communication network to enable access selection, mobility decision, traffic steering and/or access point association, wherein the information is exchanged between the WLAN network node and the network node of the cellular radio communication network.

8. The method of claim 3, wherein the WLAN message is a Probe Request message including the identifier valid in the cellular radio communication network, a Generic Advertisement Service (GAS) message including the identifier valid in the cellular radio communication network, and/or an Access Network Query Protocol (ANQP) message including the identifier valid in the cellular radio communication network.

9. A network node configured for operation in a Wireless Local Area Network, WLAN, and configured to identify a wireless device being attached to a cellular radio communication network,
wherein the network node is configured to receive an identifier of the wireless device valid in the cellular radio communication network, before association of the wireless device in the WLAN,
wherein the network node is configured to receive the identifier of the wireless device valid in the cellular radio communication network in a WLAN message from the wireless device;
wherein the network node is configured to extract the identifier from the WLAN message; and
wherein network node is configured to obtain information representing the identity of the wireless device in the cellular radio communication network based on the identifier.

10. The network node of claim 9, wherein the network node in the WLAN is configured to receive the identifier of the wireless device valid in the cellular radio communication network in a vendor-specific information field in the WLAN message or in a new information field included in the WLAN message and to extract the identifier from the vendor-specific information field or the new information field.

11. The network node of claim 9, wherein the network node in the WLAN is configured to receive the identifier as part of the pre-association signaling for the WLAN.

12. The network node of claim 9, wherein the network node in the WLAN is configured to receive the identifier in a Probe Request message including the identifier valid in the cellular radio communication network, a Generic Advertisement Service (GAS) message including the identifier valid in the cellular radio communication network, and/or an Access Network Query Protocol (ANQP) message including the identifier valid in the cellular radio communication network.

13. The network node of claim 9, wherein the cellular radio communication network is a communication network operating according to a 3rd Generation Partnership Project (3GPP) standard, and the identifier is a 3GPP identifier related to the wireless device.

14. The network node of claim 9, wherein the identifier includes
a Mobility Management Entity (MME) identifier and a MME-Temporary Mobile Subscriber Identity (M-TMSI).

15. A network node configured to assist in the exchange of information related to a wireless device between at least two different types of wireless networks including a Wireless Local Area Network (WLAN) and a cellular radio communication network,
wherein the network node in the WLAN is configured to receive an identifier of the wireless device valid in the cellular radio communication network, before association of the wireless device in the WLAN,
wherein the network node in the WLAN is configured to receive the identifier of the wireless device valid in the cellular radio communication network, in a WLAN message from the wireless device;
wherein the network node in the WLAN is configured to extract the identifier valid in the cellular radio communication network from the WLAN message; and
wherein the network node in the WLAN is configured to assist in the exchange of information related to the wireless device between the WLAN and the cellular radio communication network based on the identifier valid in the cellular radio communication network;
wherein the network node in the WLAN is configured to contact a network node of the cellular radio communication network for exchange of information related to the wireless device between the WLAN and the cellular radio communication network based on the identifier to enable coordination of information related to the wireless device between the different types of networks.

16. The network node of claim 15, wherein the network node in the WLAN is a WLAN access point or a WLAN access controller.

17. The network node of claim 15, wherein the network node in the WLAN comprises a processor and a memory, the memory comprising instructions executable by the processor, whereby the processor is operative to identify the wireless device and/or assist in the exchange of information related to the wireless device.

18. The network node of claim 15, wherein the network node in the WLAN is configured to request information valid for the wireless device in the cellular radio communication network from the cellular radio communication network, or transfer information valid for the wireless device in the WLAN to the cellular radio communication network.

19. The network node of claim 15, wherein the information is related to or used for access selection, mobility, traffic steering and/or access point association, wherein the information is exchanged between the WLAN network node and the network node of the cellular radio communication network.

20. The network node of claim 15, wherein the information is context information related to the wireless device, radio-access related information, or information related to resources, load, or other conditions for the wireless device in the WLAN and/or the cellular radio communication network, wherein the information is exchanged between the WLAN network node and the network node of the cellular radio communication network.

21. The network node of claim 15, wherein the information is context information related to the wireless device and/or radio access related information from a network node of the cellular radio communication network to enable access selection, mobility decision, traffic steering and/or access point association, wherein the information is exchanged between the WLAN network node and the network node of the cellular radio communication network.

22. The network node of claim 15, wherein the network node in the WLAN is configured to receive the identifier in a Probe Request message including the identifier valid in the cellular radio communication network, a Generic Advertisement Service (GAS) message including the identifier valid in the cellular radio communication network, and/or an Access Network Query Protocol (ANQP) message including the identifier valid in the cellular radio communication network.

* * * * *